(12) United States Patent
Brunel et al.

(10) Patent No.: US 10,388,149 B2
(45) Date of Patent: Aug. 20, 2019

(54) METHOD FOR LOCAL CONTROL OF AN ELECTRONIC DEVICE

(71) Applicant: ORANGE, Paris (FR)

(72) Inventors: Laurent Brunel, Châteaugiron (FR); Dimitri Bricheteau, Rennes (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/764,648

(22) PCT Filed: Sep. 23, 2016

(86) PCT No.: PCT/FR2016/052413
§ 371 (c)(1),
(2) Date: Mar. 29, 2018

(87) PCT Pub. No.: WO2017/055715
PCT Pub. Date: Apr. 6, 2017

(65) Prior Publication Data
US 2018/0322773 A1  Nov. 8, 2018

(30) Foreign Application Priority Data

Sep. 30, 2015 (FR) ..................... 15 59286

(51) Int. Cl.
*G08C 17/02* (2006.01)
*H04W 4/70* (2018.01)
(Continued)

(52) U.S. Cl.
CPC ............ *G08C 17/02* (2013.01); *G06F 3/017* (2013.01); *H04L 67/125* (2013.01); *H04L 67/24* (2013.01);
(Continued)

(58) Field of Classification Search
CPC ....... H04W 76/30; H04W 76/14; H04W 4/70; H04W 4/80; H04L 67/24; H04L 67/125; G08C 17/02; G06F 3/017
See application file for complete search history.

(56) References Cited

U.S. PATENT DOCUMENTS

2002/0130834 A1    9/2002   Madarasz et al.
2006/0179079 A1*   8/2006   Kolehmainen ....... G06F 9/4862
(Continued)

OTHER PUBLICATIONS

English translation of the Written Opinion of the International Searching Authority dated Dec. 14, 2016, for corresponding International Application No. PCT/FR2016/052413, filed Sep. 23, 2016.
(Continued)

*Primary Examiner* — Leon Flores
(74) *Attorney, Agent, or Firm* — David D. Brush; Westman, Champlin & Koehler, P.A.

(57) ABSTRACT

A method for local management of a device that is capable of communicating with at least one terminal that is capable of processing and returning user interface data of the device. The method includes the following steps on the device: positioning the device in receiving mode on a first radio link; detecting the entry of the at least one terminal into the range of the device on the first radio link; preparing the user interface data of the device to be transmitted to the terminal detected within the range of the device; transmitting the user interface data to the terminal.

15 Claims, 2 Drawing Sheets

(51) Int. Cl.
  *H04W 4/80*     (2018.01)
  *H04W 76/30*    (2018.01)
  *H04W 76/14*    (2018.01)
  *G06F 3/01*     (2006.01)
  *H04L 29/08*    (2006.01)
  *H04N 21/436*   (2011.01)

(52) U.S. Cl.
  CPC ............. *H04W 4/70* (2018.02); *H04W 4/80* (2018.02); *H04W 76/14* (2018.02); *H04W 76/30* (2018.02); *G08C 2201/30* (2013.01); *G08C 2201/32* (2013.01); *G08C 2201/91* (2013.01); *G08C 2201/93* (2013.01); *H04N 21/43615* (2013.01)

(56) References Cited

U.S. PATENT DOCUMENTS

| | | |
|---|---|---|
| 2012/0268286 A1 | 10/2012 | Jin et al. |
| 2014/0108677 A1 | 4/2014 | Yamada |
| 2015/0029880 A1 | 1/2015 | Burns et al. |
| 2017/0272824 A1* | 9/2017 | Bunner .............. H04N 21/4126 |

OTHER PUBLICATIONS

International Search Report dated Dec. 14, 2016, for corresponding International Application No. PCT/FR2016/052413, filed Sep. 23, 2016.

Written Opinion of the International Searching Authority Dec. 14, 2016, for corresponding International Application No. PCT/FR2016/052413, filed Sep. 23, 2016.

"Core System Package [Low Energy Controller volume]" Specification of the Bluetooth System—Specification vol. 6, Covered Core Package Version: 5.1, Publication Date: Jan. 21, 2019.

"Digital Enhanced Cordless Telecommunications (DECT); Ultra Low Energy (ULE); Machine to Machine Communications; Part 1: Home Automation Network (phase 1)", Technical Specification, ETSI TS 102 939-1 V1.2.1 (Mar. 2015).

RVU Protocol, The RVU Alliance: "Networked Home Entertainment With Pixel Accurate Remote Graphics", White Paper, 14 pages.

* cited by examiner

METHOD FOR LOCAL CONTROL OF AN ELECTRONIC DEVICE

CROSS-REFERENCE TO RELATED APPLICATIONS

This Application is a Section 371 National Stage Application of International Application No. PCT/FR2016/052413, filed Sep. 23, 2016, which is incorporated by reference in its entirety and published as WO 2017/055715 A1 on Apr. 6, 2017, not in English.

TECHNICAL FIELD

The present invention relates to the field of electronics. More particularly, the present invention relates to the interoperability of electronic devices to enable one electronic device to benefit from the functionalities of another electronic device, in this case called a terminal, having a rendering means for a user.

PRIOR ART

Some electronic devices, such as for example home gateways (or 'boxes' in English terminology), digital decoders (or 'set top boxes' in English terminology), home appliances (refrigerators, electric radiators, etc.), have a small screen, or do not have one. It is therefore difficult to know their internal data (status, capabilities, control modes, etc.).

It is known to obtain such data via a communication network, in particular a home local area network. Document US 2014/0108677 A1 describes for example a system in which a terminal of a local area network is able to connect to a master device so as to receive a description of the device via a local area network protocol (UPnP).

However, some apparatuses are not connected to a communication network (for example a refrigerator having 'smart' capabilities may or may not be connected to the household's local area network). For other appliances, although they are connected to the communication network (for example a home gateway or an STB), it is not always desirable to control them or to acquire their internal data via this network, in particular for reasons of simplicity: controlling a device on the local area network assumes knowing about it (via, for example, a discovery step).

The invention offers a solution that does not have the drawbacks of the prior art.

THE INVENTION

To this end, according to one functional aspect, one subject of the invention is a method for locally managing an electronic device able to communicate with at least one terminal able to process and render user interface data of the device, the method including the following steps on the device:
putting the device into reception mode on a first radio link;
detecting the entry of said at least one terminal into the range of the device on said first radio link;
preparing the user interface data to be transmitted to said terminal detected within the range of the device;
transmitting said user interface data to said terminal.

Mobile terminals (smartphones, tablets, etc.) are nowadays equipped with a processor and with convenient rendering capabilities; they may advantageously be used to render, for example display, data originating from another device.

Advantageously, the invention affords the advantage of locally transferring a user interface onto such a mobile terminal (e.g. a smartphone) situated in the proximity of the electronic device, as soon as this terminal enters into the range of the device, that is to say as soon as the signal is able to be received correctly by the device. This concept of range, which is manifested in a minimum distance to be complied with between the two appliances, depends on the limitations of the radio technology used and on the security level to be complied with. For example, it is possible to use, as a basis, a contactless technology using short-distance radio technologies, in particular of RFID (from the English Radio Frequency IDentification) or NFC (for 'Near Field Communication') type, or radio technologies of Bluetooth, Wi-Fi, etc. type. It is thus possible, by receiving its interface, to locally control any electronic device simply by moving the mobile terminal close to said device.

User interface (also called HMI, for Human Machine Interface) of an electronic device is understood to mean all of the information and hardware and software mechanisms enabling a user to communicate with the device. In this case, this may indiscriminately involve a text interface (using semi-graphic characters to display the menus, the dialog boxes, messages or any other element intended for the user), a graphical interface (for which the items to be manipulated are shown in the form of icons on which the user is able to emulate physical manipulations), a web interface (a graphical interface of a web application, manipulated by way of a web browser), or else a voice interface, etc.

There are solutions and associated standards for transferring a user interface of a device to a terminal in the context of the local area network. For example, the RVU (for 'Remote view') protocol, based on the UPnP (from the English 'Universal Plug and Play') and DLNA (from the English 'Digital Living Network Alliance') standards, which standards make it possible to share audiovisual content between the content servers and the terminals of a home network, provides technical specifications that enable an accurate rendering of the user interfaces on the various devices of the network.

However, as the desired aim of these solutions is to transfer the display of the device for the purpose of a monitoring, rendering or remote control operation (for example to control the radiators, or the box, from outside the household, view audiovisual content on a PC, etc.), the mobile terminal and the device are generally quite far apart from one another (typically a few meters to a few tens of meters in a household, or even a greater distance if the user is not at home) and communicate via a communication network (local area network and/or wide area network).

In the context of the invention, it is not useful for the device to be connected to the local area network. Advantageously, the user thus dispenses with a discovery step, since it suffices for said user to move close enough to the device in question. In addition, the terminal and the device may be disconnected, while the invention is being implemented, from any communication network.

According to one particular mode of implementation of the invention, a management method such as described above is furthermore characterized in that the detection step includes a sub-step of evaluating a distance between the device and the terminal.

Advantageously, according to this mode, a certain proximity is required in order for the communication to be able to be established between the device and the terminal. In particular, if the range of the device is too high for the terminal to be considered 'in proximity', a distance measurement makes it possible to add to this concept of proximity: the terminal must be within the range of and also at a maximum distance from the device. For example, in the context of Wi-Fi communication, the range may reach several tens of meters, thereby not enabling this range to be associated with a concept of proximity within the meaning of the invention. The restriction to a few centimeters, or tens of centimeters, which in this case defines the proximity within the meaning of the invention, makes it possible to transfer the graphical interface only when the user's mobile is actually located in the proximity of the device. Advantageously, this distance is variable and may defined when the device is started up, or during operation, etc. The distance may be evaluated conventionally, according to one example, by measuring the power of the signal received during the reception step. This evaluation depends on the technology that is used.

According to a second particular mode of implementation of the invention, which may be implemented in addition or as an alternative to the previous one, the method is characterized in that the detection step includes a sub-step of detecting a predetermined movement of the terminal corresponding to an intentional gesture of the user, and in that the step of transmitting the user interface data is carried out only after said predetermined movement is detected.

Advantageously, according to this mode, an intentional gesture of the user, leading to a predetermined movement of the terminal (rotation, acceleration, fast approach, contact with the device, etc.) is required for communication to be able to be established between the device and the terminal. The movement may be measured conventionally by measuring the characteristics of the signal received during the reception step. The measurement depends on the technology that is used and on the context of use. For example, a fast approach is manifested in a rapid increase in the power of the radio signal, which may be analyzed by the device. According to another example, the terminal itself may transmit, using the signal, an item of confirmation information (the terminal may use a gyroscope to determine a rotation, or the user may press a button to confirm his approach gesture, or say a word, etc.). Advantageously, according to this mode, it is ensured, through an intentional gesture of the user, that the interface is not needlessly transmitted to a terminal that may be unintentionally moved close to the device, or for a purpose other than that of receiving the graphical interface of the device.

According to a third particular mode of implementation of the invention, which may be implemented in addition or as an alternative to the preceding ones, the method is characterized in that the detection step includes a sub-step of receiving a rendering request originating from the terminal.

Advantageously, according to this mode, the device transmits the interface data only when it has received a specific request from the terminal. It is thus ensured that the interface is not needlessly transmitted to a terminal that may be unintentionally moved close to the device, or for a purpose other than that of receiving the graphical interface of the device.

According to a fourth particular mode of implementation of the invention, which may be implemented in addition or as an alternative to the preceding ones, the method is characterized in that it furthermore includes, prior to the transmission step, a step of emitting a signal containing a rendering request intended for the terminal.

Advantageously, according to this mode, a request is sent to the terminal before transmitting the interface to it, thereby avoiding transmitting the interface to a terminal that may be unintentionally moved close to the device, or for a purpose other than that of receiving the graphical interface of the device. This request may be accompanied by a particular demand, for example for the terminal to carry out a predetermined movement, or carry out a particular action.

According to a fifth particular mode of implementation of the invention, which may be implemented in addition or as an alternative to the preceding ones, the method is characterized in that it furthermore includes, prior to the transmission step, a step of establishing a point-to-point communication session with the terminal on a second radio link for transmitting the user interface data.

This mode of implementation of the invention makes it possible to ensure reliable management of the device: the point-to-point communication limits the knowledge of the exchanged data to the electronic device and to the terminal located in the proximity. Advantageously, the device does not need to be connected to a local area network. Advantageously again, the data are not necessarily transmitted on a communication network, but only exchanged between the two apparatuses (terminal and device). The data exchanged over the point-to-point session are thus not able to be intercepted by another device, which device may for example be spying on the local area network.

According to one variant of this particular mode of implementation of the invention, the method is characterized in that the second radio link is different from the first radio link.

Advantageously, according to this mode, it is possible to change radio technology to transmit the data of the graphical interface to the terminal. For example, the communication may be initiated using NFC (that is to say that the first signal, signaling the presence of the terminal within the range of the device, is emitted in near field) and the interface data are subsequently exchanged using Bluetooth. It is thus advantageously possible to dispense with the drawbacks of the first communication technology used, while at the same time benefiting from the advantages thereof. According to the example, the range of the NFC is limited to a few centimeters, this being particularly beneficial for the approach phase (the very low range of the NFC obliges the user to move very close to the device, or even touch it, thereby naturally confirming his movement as being intentional), but may prove restrictive thereafter, as the user has to remain physically very close, or even in contact, with the device, whereas Bluetooth makes it possible to be situated at a greater distance; NFC also does not allow the exchange of high-volume data, unlike Bluetooth.

According to another particular mode of implementation of the invention, which may be implemented as an alternative or in addition to the preceding ones, the user interface data are tailored depending on the capabilities of the terminal.

This mode of implementation of the invention makes it possible to tailor the data of the graphical interface to the capabilities of the terminal that will render said data, for example in terms of the display: if the terminal has a large screen, it is able to display more information that is comprehensible to the user. If, by contrast, the terminal has a small screen, it is beneficial to send to said terminal minimal data to display. Such a tailoring method is well known to those skilled in the art, for example in the specifications of the aforementioned RVU standard. The capabilities of the terminal may for example be transmitted by said terminal to the device during the step of establishing the communication session.

According to another particular mode of implementation of the invention, which may be implemented as an alternative or in addition to the preceding ones, the data of the user interface are encoded by way of a markup language using semantics tailored to the description of the elements of the user interface, before being transmitted to the terminal.

This mode of implementation of the invention makes it possible simply to transmit, to the terminal, data that are easily able to be displayed, for example in the form of XML/HTML, etc. language. Data of this type are able to be interpreted by most existing standards. It is also easier to adapt, with this kind of data, to the capabilities of the terminal.

According to another particular mode of implementation of this aspect of the invention, which may be implemented as an alternative or in addition to the preceding ones, the management method is furthermore characterized in that it includes a step of receiving a command originating from the terminal.

Advantageously, the communication session established between the electronic device and the terminal may be used to exchange commands selected by a user via the user interface that has been rendered on his terminal. This command may be generated by pressing a button, key, etc., so as to command the device to carry out an action. This may involve for example a command with the aim of lowering the temperature of the device (radiator, refrigerator, etc.), modifying a parameter of the device (configuration of a gateway, of an STB, etc.), etc.

According to a variant of the fifth particular mode of implementation of the invention, the method furthermore includes a step of closing the communication session.

Advantageously, this embodiment makes it possible to explicitly close the session between the terminal and the device. This action may be necessary if the terminal or the device wishes to restart another session (for example Wi-Fi direct) using the same technology, or if the device wishes to make itself available for another terminal, etc.

According to a hardware aspect, the invention also relates to an electronic device able to communicate with at least one terminal able to process and render user interface data of the device, including:
  a module for putting the device into reception mode on a first radio link;
  a module for detecting the entry of a terminal into the range of the device on the first radio link;
  a processing module configured to prepare the user interface data following the detection following the detection of the entry of the terminal into the range of the device;
  a module for transmitting said user interface data, activated following the detection of the entry of the terminal into said range.

The term module may correspond equally to a software component or to a hardware component or to a set of software and hardware components, a software component itself corresponding to one or more computer programs or subroutines or, more generally, to any element of a program able to implement a function or a set of functions such as described for the modules in question. In the same manner, a hardware component corresponds to any element of a hardware assembly able to implement a function or a set of functions for the module in question (integrated circuit, chip card, memory card, etc.).

According to another hardware aspect, the invention also relates to a household appliance including an electronic device such as described above.

Household appliance is understood here to mean any household device that enables a user to interact via an HMI (home gateway, STB, washing machine, refrigerator, etc.), in particular appliances that do not have a screen large enough to display the required data.

According to yet another hardware aspect, the invention relates to a system comprising an electronic device such as described above and a terminal including:
  a communication module able to emit a signal on a first radio link;
  a processing module able to process received user interface data, and
  a rendering module for interacting with a user.

According to another hardware aspect, the invention also relates to a computer program able to be implemented for the method for locally managing an electronic device such as described above, the program comprising code instructions that perform the steps of the method when the program is executed by a processor of the electronic device.

This local management device and this computer program have features and advantages that are analogous to those described above in relation to the method for locally managing an electronic device.

According to yet another hardware aspect, the invention pertains to a recording medium able to be read by a data processor and on which is recorded a program comprising program code instructions for the execution of the steps of a method such as defined above.

The invention will be better understood on reading the following description, given by way of example and with reference to the appended drawings.

THE FIGURES

DETAILED DESCRIPTION OF AN EXEMPLARY EMBODIMENT ILLUSTRATING THE INVENTION

Figure 1:
FIG. 1 illustrates an electronic device controlled locally by a mobile terminal according to one embodiment.

FIG. 1 illustrates an electronic device (6) controlled locally by a mobile terminal (4) according to one embodiment.

According to this embodiment, the electronic device is a service gateway (6) and the user interface (HMI) to be transferred onto the terminal is an interface for managing the gateway.

Communication is established between the mobile terminal and the electronic device: the communication, also called 'point-to-point session' hereinafter, symbolized by the double arrow (SP), is performed in bidirectional point-to-point mode in this example. This communication is local, that is to say that it is limited to a certain distance between the two appliances, this distance varying depending on the technology that is used. It may be based on various 'proximity' radio technologies:

communication in what is termed 'ad-hoc' mode between two appliances provided with a Wi-Fi function. In 'ad-hoc' mode, also called 'Wi-Fi Direct' (WFD) mode, and in contrast to 'infrastructure' mode, the wireless devices connect to one another so as to form point-to-point (or 'peer-to-peer' in English) links, that is to say a network in which each device performs, at the same time, the role of client and the role of server, or access point. The 'Wi-Fi Direct' mode, also called Wi-Fi P2P (Peer to Peer) mode, is a technology developed by the 'Wi-Fi Alliance' consortium that enables sharing of data between various peripheral devices (computers, TVs, mobiles, etc.) via their Wi-Fi connection without an intermediate Wi-Fi access point (router, gateway, etc.). For example, according to this embodiment, the terminal is configured to be put into Wi-Fi mode (termed 'Hotspot', that is to say that it positions itself as a Wi-Fi access point). The electronic device, the Wi-Fi module of which is also active, detects its presence and puts itself into Wi-Fi 'direct', thus opening a session between the two devices. This embodiment affords the advantage of enabling the exchange of data via a secure channel. Wi-Fi technology is indeed generally well known to those skilled in the art for its capabilities of affording good security on the channel if said technology is configured judiciously. It is robust, reliable and fast. By contrast, it has quite a high range (greater than ten meters) and hence permits the two devices to be quite far apart. It is therefore preferable, if the initial signal from the terminal is received using Wi-Fi, to ensure that said terminal is positioned in the proximity of the device, that is to say at a distance smaller than a certain threshold, that may have been defined in advance on the device, or form part of a standard, etc.

Bluetooth (BT) communication; Bluetooth technology is a short-distance radio technology intended to simplify connections between electronic apparatuses and developed by the 'Bluetooth SIG' association. It is particularly widespread and useful for establishing a point-to-point connection between apparatuses that are close. It is very simple to use, consumes little energy and is nevertheless secure.

near field communication, for example of NFC (Near Field Communication) type; these communications, based mainly on the ISO (International Organization for Standardization) 14443 standard, use wireless technologies to enable an exchange of information between two peripheral devices separated by a short distance, typically of smaller than ten centimeters.

As an alternative, this channel may be established by any of the means available to those skilled in the art: mention may be made for example of infrared (RF), the Zigbee protocol (a protocol that enables communication in local area networks, on a radio link, with reduced consumption), the 'DECT Ultra Low Energy' standard (DECT ULE for short, an extension of DECT for low-energy applications), or else the 'Bluetooth Low Energy' standard (BLE for short), the aim of which is to supply a reduced power in comparison with the standard applications of the Bluetooth standard, etc.

As this type of what is termed 'local' communication between the two devices is private, given that it is established point-to-point, it has a certain number of advantages, in particular in terms of security, but above all it is not necessary for the appliances to be connected to a network.

According to one variant, this channel may be established in broadcast mode: the device may broadcast its HMI to a plurality of terminals.

When the device detects that the terminal is within its range, that is to say that it receives the signal correctly, it may prepare the data of the graphical interface to be transmitted, after an optional step of measuring the proximity of the terminal. Specifically, if the terminal, in the context of Wi-Fi or Bluetooth, is several meters away, it cannot reasonably be assumed that the user wishes to automatically receive the interface of this device so as to render it. In the context of the invention, he has to move close to said device in order to make his wish explicit. However, this measurement is optional, in particular in the case of NFC, for which the range is naturally limited to a few centimeters.

A local communication session may then be established between the two appliances; according to this embodiment of the invention, the session is established on the same channel (Wi-Fi, Bluetooth or NFC) as the one that was used for the request. However, according to one variant, the point-to-point session may be established according to another communication mode, for example using Wi-Fi, whereas the initial request was made using NFC.

The electronic device may transmit the data relating to its HMI. The mobile terminal receives the data, displays the interface for a user and awaits a possible command from said user (lower the temperature, modify the configuration of the box, etc.).

At the end of the communication session, an explicit or implicit disconnection may take place. The disconnection is explicit in the case of a prior Wi-Fi link, as the electronic device is not able to connect both to the mobile terminal in point-to-point in 'Wi-Fi Ad-Hoc' mode and to a service gateway in 'Wi-Fi infrastructure' mode. It is therefore preferable to disconnect it. The disconnection is optional in the case of Bluetooth. The disconnection of two Bluetooth devices is generally implicit (if the two apparatuses move apart by a range greater than the maximum range permitted by the standard). It is also optional in the case of NFC, as the electromagnetic field decreases with the distance, naturally ending the communication when the terminal is no longer within the range of the device.

Figure 2:
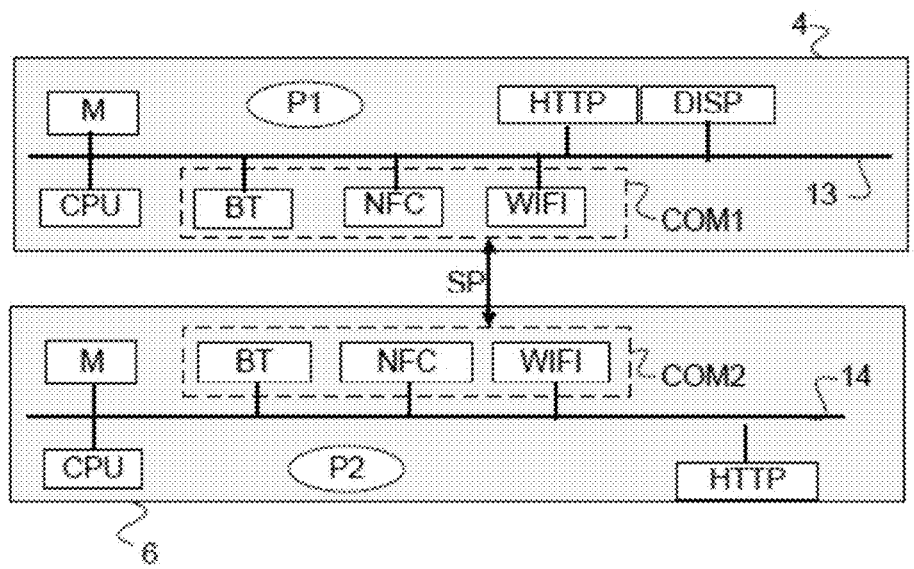
FIG. 2 shows a hardware architecture of an electronic device controlled locally by a mobile terminal and of said mobile terminal according to one embodiment.

FIG. 2 shows a hardware architecture of an electronic device controlled locally by a mobile terminal and of said mobile terminal according to one embodiment.

The mobile terminal (4) comprises, as is conventional, memories M articulated around a processor CPU. The memories may be of ROM (from the English Read Only Memory) or RAM (from the English Random Access Memory) type, removable or fixed, etc. The random access memory makes it possible to store, in the short term, computing data used when implementing a method according to some embodiments. The non-volatile memory (for example of EEPROM type) makes it possible to store for example a computer program according to one embodiment for execution thereof by a processor. It communicates with the electronic device (6) via a communication module (COM1) that enables it to wirelessly connect via a radio channel of Wi-Fi, Bluetooth (BT), NFC or even Zigbee (not shown), etc. type. As described previously with reference to FIG. 1, a point-to-point communication channel (SP) is established in this example between the two devices (4) and (6). Multi-point communication of the device to a plurality of terminals could be contemplated as an alternative. The terminal also includes, in this example, a communication module of HTTP type for providing communications of HTTP type, for example of WebSocket (WS) type; it will be noted that communication of WS type is possible on a Bluetooth link.

The module P1, which may be a software and/or hardware module, is in particular capable of carrying out the actions that will be described with reference to FIG. 3, that is to say sending requests and commands to the electronic device and processing the user interface data, in accordance with methods according to some embodiments.

The terminal furthermore includes a user interface, such as for example a keypad (not shown), for receiving commands from a user, and a screen (DISP) for rendering the user interface of the electronic device.

All of these modules communicate with one another, as is conventional, via a data bus (13).

The electronic device (6) also comprises memories M articulated around a processor CPU. It connects to the mobile terminal via the link SP in Wi-Fi or Bluetooth, etc. mode via its communication module COM2, which is similar to the module COM1 described above.

It also includes a module (P2) responsible for processing information: establishing the communication with the mobile terminal, receiving control commands or rendering requests from the mobile terminal, preparing (formatting, encoding, etc.) the user interface data, transmitting the user interface to the terminal, etc.

It also possibly includes a communication module of HTTP type.

All of the modules communicate with one another, as is conventional, via a data bus (14).

Figure 3:
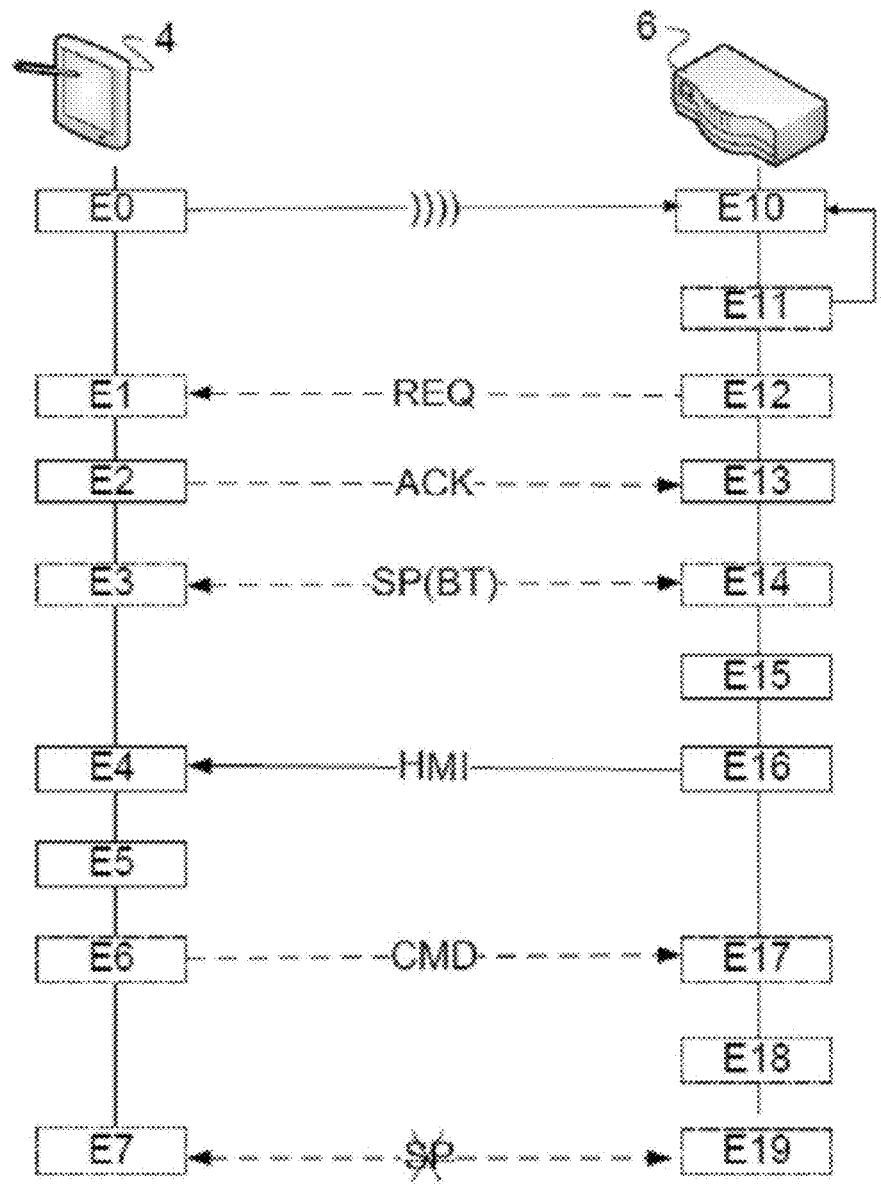
FIG. 3 shows a flow chart illustrating the various steps of the method on the electronic device and on the mobile terminal locally controlling said electronic device, according to one embodiment.

FIG. 3 shows a flow chart illustrating the various steps of the method according to one embodiment on the electronic device (6) and a corresponding exemplary method on the mobile terminal (4).

The aim of the steps is to establish communication between the mobile terminal (4) and the electronic device (6) in order to transmit the user interface (HMI) of the device to the terminal when said terminal is located within the range of the device.

During a step E0, the terminal moves close to the electronic device. The terminal emits a radio signal intended for the device. It will be noted that, in the case of NFC, the terminal, if it is passive, it not able to emit a signal before being placed in the field of the device.

In this example, it is assumed that the appliance is initiating the establishment of the communication between the two apparatuses.

The electronic device is put into reception mode (Wi-Fi 'hotspot', Bluetooth, NFC, etc.) during step E10. For example, the user intentionally puts the device into this mode (it is possible to contemplate a software or hardware button, a command, etc.). In another example, the device is always in reception mode.

When the terminal enters into the range of the device, said device receives the radio signal correctly. It is then able to confirm the step of detecting the terminal during a step E11. The device may also optionally carry out, in step E11, an additional step for confirming the detection of the terminal, in particular an evaluation of the distance at which the terminal is located.

As long as the detection has not ended, the following steps are not carried out. When the terminal is detected, an optional step E12 enables the device to transmit a request (REQ) to the terminal. This request is useful for receiving, during a following step E13, an acknowledgement message that the terminal sent during step E2, so as to ensure that the user actually wishes to receive the interface data, and that the terminal has therefore not been detected erroneously. The device may optionally carry out, in step E13, an additional step of detecting the terminal, for example by measuring an intentional gesture from the user, manifested in a predetermined movement of the terminal (rotation, acceleration, etc.), an acoustic signal, etc.

According to one variant, the steps presented above, in which the appliance detects and accepts the terminal, are reversed such that the terminal initiates the establishment of the session. The terminal then carries out the detection steps (and possibly the optional distance evaluation and request steps) that are the responsibility of the device in the example described above (steps E10, E11, E12, E13).

In the following step E14 (respectively E3 for the terminal), a point-to-point communication session (SP) is established between the two entities. It will be noted that this session may be established on a radio channel that is different from the first. In some beneficial examples:

the first channel, used to detect the terminal, is an NFC channel, and the second channel, used to exchange the data, is a Wi-Fi or BT channel. This sequence makes it possible to have very simple detection of the terminal (since the range of the NFC is naturally very small) followed by a communication phase during which the terminal is able to be further away from the device and the volume of data exchanged is able to be higher.

the first channel, used to detect the terminal, is a Bluetooth channel, and the second channel, used to exchange the data, is a Wi-Fi channel.

etc.

According to one variant, the communication is established in broadcast mode, such that the interface of the device is transmitted to a plurality of terminals detected within the range of the device.

During a step E15, the electronic device processes the request, that is to say that it prepares the user interface data, for example the graphical interface data.

The data of the interface are then transmitted to the terminal during a step E16. The terminal receives said data during a step E4; it then processes these data during a step E5 and renders them: in this example, it displays the graphical interface on its screen (DISP). According to one variant, this may involve a web interface, a voice interface rendered via a speaker, etc.

The processing unit of the terminal optionally emits one or more commands during a step E6 (CMD) via its communication module. The processing module of the device receives the command (E17) and carries out processing operations to convert it into an effective command for the device (lower the temperature, modify the configuration of the box, reduce the speed of a motor, etc.) during a step E18.

Once the user interface has been received and exploited by the user, the point-to-point session (SP) may optionally be closed during a step E19 (respectively E7 on the terminal). Closing the session enables the two devices to be able to exit the point-to-point mode in order for example to establish another session.

A computer program for implementing a method according to one embodiment of the invention may be created on the basis of the present detailed description.

It goes without saying that the embodiment that has been described above has been given purely by way of wholly non-limiting indication, and that numerous modifications may easily be made by those skilled in the art without, however, departing from the scope of the invention. In particular:

The sending of the user interface could be triggered by the detection of a signal other than a radio signal (an acoustic, visual, etc. signal) and relate to the detection of a particular movement, of a particular graphic pattern, of a particular mobile terminal, of a biometric fingerprint, etc.

The data may be sent using any other conceivable communication mode: radio in accordance with all known protocols, but also light via Li-Fi (a data transmission technology using an LED-type appliance), etc.

The data may be transferred in accordance with various protocols and formats that are either standard (of HTTP and XML type) or proprietary, with all possible abstraction levels, possibly ranging as far as sending data in a buffer ('frame buffer') in raw form.

The invention claimed is:

1. A method for locally managing a device able to communicate with at least one terminal able to process and render user interface data of the device, the method including the following acts on the device:
    detecting entry of said at least one terminal into a range of the device on said first radio link;
    preparing the user interface data of the device to be transmitted to said terminal detected within the range of the device; and
    transmitting said user interface data to said terminal on a second radio link, which is different from the first radio link.

2. The method as claimed in claim 1, wherein detecting includes evaluating a distance between the device and the terminal.

3. The method as claimed in claim 1, wherein detecting includes detecting a predetermined movement of the terminal corresponding to an intentional gesture of the user, and wherein transmitting the user interface data is carried out only after said predetermined movement is detected.

4. The method as claimed in claim 1, wherein detecting includes receiving a rendering request originating from the terminal.

5. The method as claimed in claim 1, furthermore comprising, prior to the transmitting, emitting a signal containing a rendering request intended for the terminal.

6. The method as claimed in claim 1, furthermore comprising, prior to the transmitting, establishing a point-to-point communication session with the terminal on a second radio link for transmitting the user interface data.

7. The communication method as claimed in claim 6, furthermore comprising closing the communication session.

8. The method as claimed in claim 1, wherein the user interface data are tailored depending on the capabilities of the terminal.

9. The method as claimed in claim 1, wherein the data of the user interface are encoded by way of a markup language using semantics tailored to the description of the elements of the user interface, before being transmitted to the terminal.

10. The communication method as claimed in claim 1, furthermore comprising receiving a command originating from the terminal.

11. The method as claimed in claim 1, wherein the first radio link is a short distance radio link relative to the second radio link.

12. An electronic device able to communicate with at least one terminal able to process and render user interface data of the device, wherein the device comprises:
    a processor; and
    a non-transitory computer-readable medium comprising instructions stored thereon, which when executed by the processor configure the device to perform acts comprising:
    detecting entry of said at least one terminal into a range of the device on the first radio link;
    preparing the user interface data following the detection of the entry of the terminal into the range of the device; and
    transmitting said user interface data, activated following the detection of the entry of the terminal into said range on a second radio link, which is different from the first radio link.

13. A household appliance including the device as claimed in claim 12.

14. A system comprising the electronic device as claimed in claim 12 and a terminal including:
    a processor; and
    a non-transitory computer-readable medium comprising instructions stored thereon, which when executed by the processor of the terminal configure the terminal to perform acts comprising:
    emitting a signal on the first radio link;
    receiving the user interface data, and
    rendering the user interface data and interacting with a user.

15. A non-transitory computer-readable medium comprising a computer program stored thereon and including code instructions for implementing a method for locally managing an electronic device when said program is executed by a processor of the electronic device, wherein the electronic device is able to communicate with at least one terminal able to process and render user interface data of the device, the method including the following acts performed on the electronic device:
    detecting entry of said at least one terminal into a range of the device on said first radio link;
    preparing the user interface data of the device to be transmitted to said terminal detected within the range of the device; and
    transmitting said user interface data to said terminal on a second radio link, which is different from the first radio link.

* * * * *